United States Patent
Ramsey et al.

(10) Patent No.: US 11,506,110 B2
(45) Date of Patent: Nov. 22, 2022

(54) OIL-SPRAY TUBE WITH POPPET VALVE

(71) Applicant: SCHAEFFLER TECHNOLOGIES AG & CO. KG, Herzogenaurach (DE)

(72) Inventors: John Ramsey, Mansfield, OH (US); Matthew Payne, Glenmont, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 295 days.

(21) Appl. No.: 16/876,700

(22) Filed: May 18, 2020

(65) Prior Publication Data
US 2021/0355856 A1    Nov. 18, 2021

(51) Int. Cl.
*F16K 15/04* (2006.01)
*F01P 7/14* (2006.01)
(Continued)

(52) U.S. Cl.
CPC ...... *F01P 7/14* (2013.01); *F01P 3/08* (2013.01); *F16K 1/14* (2013.01); *F01P 2003/006* (2013.01); *F01P 2007/146* (2013.01); *F01P 2050/24* (2013.01); *F16K 15/044* (2013.01); *F16K 2200/501* (2021.08); *Y10T 137/6086* (2015.04); *Y10T 137/7504* (2015.04)

(58) Field of Classification Search
CPC ............... F16K 15/044; F16K 27/0245; F16K 2200/501; F16K 15/02; F16K 15/04; F16K 27/0209; F01P 3/08; F01P 2003/006; F01P 2050/24; Y10T 137/6086; Y10T 137/7504
See application file for complete search history.

(56) References Cited

U.S. PATENT DOCUMENTS

| | | | | |
|---|---|---|---|---|
| 3,709,109 A | * | 1/1973 | Howe | ........................ F01P 3/08 123/41.35 |
| 6,866,011 B1 | * | 3/2005 | Beardmore | .............. F01M 1/08 123/41.35 |

(Continued)

FOREIGN PATENT DOCUMENTS

| DE | 2528244 A1 | * 12/1976 |
|---|---|---|
| EP | 1591640 | 4/2009 |
| KP | 1020130004957 | 1/2013 |

OTHER PUBLICATIONS

Machine translation DE 2528244.*
PCT International Search Report dated Sep. 1, 2021, PCT Application No. PCT/US2021/0312900.

*Primary Examiner* — Kevin F Murphy

(57) ABSTRACT

An oil-spray tube assembly includes a tube having an outer circumferential surface, an inner circumferential surface defining a hollow center, a closed distal end, an open proximal end defining an axially recessed annular seat, and an orifice extending between the inner and outer surfaces. A poppet valve has a radially extending flange and is received in the hollow center with the flange disposed on the annular seat. The valve defines an inlet, a cylindrical valve chamber in fluid communication with the inlet, an outlet exiting the valve chamber, and a valve seat between the inlet and the outlet. A ball is disposed within the valve chamber and is movable between a closed position in which the ball is seated on the valve seat to sever fluid communication between the inlet and the outlet and an open position in which the ball is spaced from the valve seat to place the inlet and outlet in fluid communication.

19 Claims, 2 Drawing Sheets

(51) Int. Cl.
*F16K 1/14* (2006.01)
*F01P 3/08* (2006.01)
*F01P 3/00* (2006.01)

(56) References Cited

U.S. PATENT DOCUMENTS

| | | | | |
|---|---|---|---|---|
| 10,167,769 | B2* | 1/2019 | Auerbach | F01P 9/06 |
| 2006/0169331 | A1* | 8/2006 | Neto | F16K 15/044 |
| | | | | 137/539 |
| 2006/0169332 | A1* | 8/2006 | Ikegawa | F16K 15/044 |
| | | | | 137/539 |
| 2008/0210314 | A1 | 9/2008 | Neto | |
| 2008/0223318 | A1 | 9/2008 | Perotto | |
| 2015/0292390 | A1* | 10/2015 | Takasaki | F01P 3/08 |
| | | | | 123/196 R |
| 2018/0126405 | A1* | 5/2018 | Ogino | F01M 1/08 |
| 2019/0305641 | A1 | 10/2019 | Matsuoka | |
| 2020/0280244 | A1 | 9/2020 | Payne et al. | |

* cited by examiner

OIL-SPRAY TUBE WITH POPPET VALVE

TECHNICAL FIELD

The present disclosure relates to thermal management of electric machines and more specifically to thermal-management systems that include an oil-spray tube with a poppet valve.

BACKGROUND

Electrified vehicles include one or more electric machines configured to act as a motor to propel the vehicle and as a generator to charge a traction battery. Electric machines generate heat during operation and require cooling. An electric machine may be air cooled or liquid cooled. An air-cooled electric machine may include cooling fins that facilitate the transfer of thermal energy from the electric machine to the air. A liquid-cooled electric machine may be cooled using oil or water-based coolant. Electric machines are frequently disposed within a transmission and may be liquid cooled using transmission fluid (oil).

SUMMARY

According to one embodiment, an oil cooling system of a hybrid module includes an oil-spray tube attachable to a housing of the hybrid module. The oil-spray tube includes a sidewall having an outer circumferential surface and an inner circumferential surface that defines a hollow center. The tube further includes a proximal end defining an axially recessed annular seat and an orifice extending between the inner and outer surfaces. A poppet valve is disposed in the hollow center. The poppet valve includes a cylindrical body seated on the inner surface and having a radially extending flange having a first side disposed on the annular seat and a second side configured to be secured against the housing of the hybrid module by attachment of the oil-spray tube to the housing. The body defining an inlet, a cylindrical valve chamber in fluid communication with the inlet and having a valve seat, and an outlet passage. A valve has a ball disposed within the valve chamber and is axially movable between a closed position in which the ball is seated on the valve seat to sever fluid communication between the inlet and the valve chamber and an open position in which the ball is spaced from the valve seat to place the inlet and the valve chamber in fluid communication.

According to another embodiment, an oil cooling system includes an oil-spray tube having a sidewall with an outer circumferential surface and an inner circumferential surface that defines a hollow center. The tube further has a proximal end defining an axially recessed annular seat and an orifice extending between the inner and outer surfaces. A poppet valve is disposed in the hollow center and configured to be secured to a housing by the tube. The poppet valve includes a cylindrical body seated on the inner surface and having a radially extending flange disposed on the annular seat. The body defines an inlet and a cylindrical valve chamber in fluid communication with the inlet. The valve chamber has a valve seat and an outlet passage. A valve has a ball disposed within the valve chamber. The ball is axially movable between a closed position in which the ball is seated on the valve seat to sever fluid communication between the inlet and the valve chamber and an open position in which the ball is spaced from the valve seat to place the inlet and the valve chamber in fluid communication.

According to yet another embodiment, a hybrid module includes a housing defining first and second oil passages and a bore having a bottom and a sidewall extending from the bottom and defining a perimeter of the bore. The first passage opens into the bottom and the second passage opens into the sidewall. An oil-spray tube defines a hollow center and an orifice in fluid communication with the hollow center and extending completely through a sidewall of the tube. The tube includes an insertion portion, a protruding portion, and a collar therebetween. A poppet valve is disposed in the hollow center. The poppet valve defining an inlet, a valve chamber, an outlet, and a movable ball configured to open and close the chamber. The insertion portion is received in the bore with the collar disposed against the housing, the first passage in fluid communication with the inlet, and the second passage in fluid communication with the outlet. An electric machine is positioned to receive oil from the second passage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modern motor vehicles may be powered by a plurality of different actuators, such as internal-combustion engines, electric machines, or in the case of a hybrid, combinations thereof. Electric machines require thermal management to prevent overheating. A thermal-management system may employ air cooling or liquid cooling to regulate the temperature of the electric machine. A liquid cooled system may utilize water-based coolant or oil (e.g., transmission fluid) as the working fluid. In one example embodiment, the thermal management system may spray, or otherwise provide, oil to the stator, the rotor, or both of the electric machine to regulate the temperature.

Figure 1:
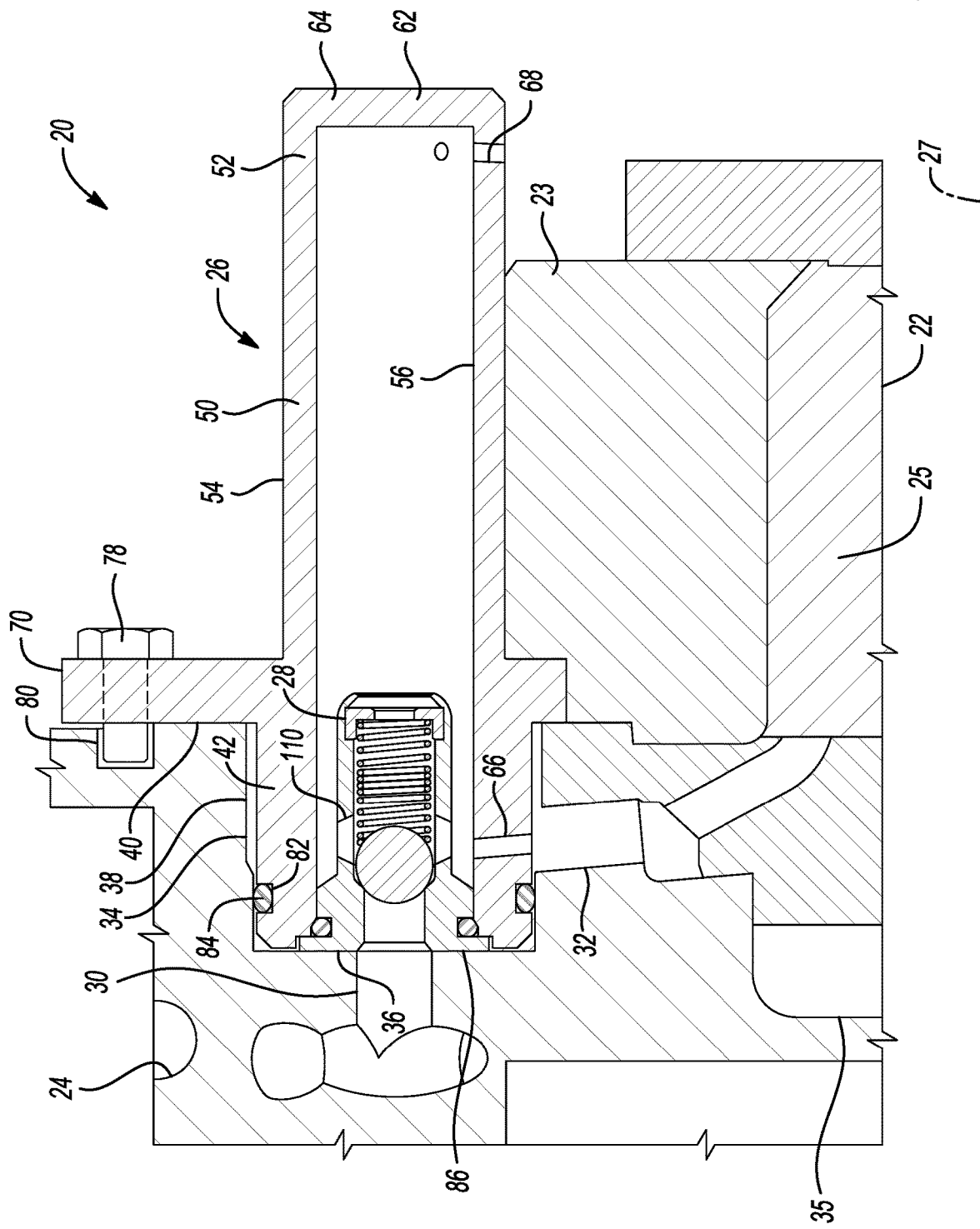
FIG. 1 illustrates a diagrammatical cross-sectional side view of an electric machine assembly.

Referring to FIG. 1, a cross-section of an electric-machine assembly 20 is schematically illustrated. Depending upon the type of vehicle architecture, an electric machine 22 may be disposed in different locations and packaged within different larger assemblies. In the case of a hybrid vehicle, the electric machine 22 may be disposed within the hybrid module (sometimes referred to a hybrid transmission). In the case of a purely electric vehicle (EV), the electric machine may be packaged as part of an electric axle. FIG. 1 illustrates the electric machine 22 attached to a housing 24. The housing 24 may be the transmission housing, such as in the case of a hybrid architecture, or may be any other suitable housing. That is, this disclosure is not limited to any particular vehicle type or architecture.

The electric machine 22 may be one or more electric machines depending upon the embodiment. The electric machine 22 may be configured to operate as a motor to propel the vehicle or as a generator to charge the traction battery. The electric machine 22 may be an alternating current (AC) machine or direct current (DC) machine. In one or more embodiments, the electric machine 22 may be a three-phase AC machine. The electric machine 22 may include a case 23 attached to the housing 24, a stator 25, and a rotor (not shown) that is supported for rotation within the stator 25. The electric-machine assembly 20 includes a centerline 27 that extends through a center of the rotor. Directional terms used herein are made with reference to the views and orientations shown in the exemplary figures. Terms such as "outer" and "inner" are relative to the centerline 27. For example, an "outer" surface means that the surfaces face away from the centerline 27, or is outboard of another "inner" surface. Terms such as "radial," "diameter," "circumference," etc. also are relative to the centerline 27. The terms "front," "rear," "upper" and "lower" designate directions in the drawings to which reference is made.

In the example of FIG. 1, the electric machine 22 is cooled by oil that is delivered through passages defined in the housing 24. The oil may be transmission fluid that is controlled by a valve body of the transmission or other control device. An oil-spray tube assembly 26 controls the flow of oil from the housing 24 to the electric machine 22. The tube assembly 26 is interposed between the passages of the housing 24 and the downstream electric machine 22 and may include a poppet valve 28 that selectively allows the oil to flow from the passages of the housing 24 to the electric machine 22.

In one or more embodiments, the housing 24 defines an oil passage 30 leading to the valve 28 and an oil passage 32 leading from the valve 28 to the electric machine 22. The oil passages 30 and 32 are connected by a bore 34 defined in the housing 24. The bore 34 includes a bottom wall 36 and a sidewall 38 that extends from the bottom wall 36 to a face 40 of the housing 24. The passage 30 opens into the bottom wall 36, and the passage 32 opens into the sidewall 38. The passage 32 extends from the bore 34 to a cavity 35 that receives at least a portion of the electric machine 22. The bore 34 receives an insertion portion 42 of the oil-spray tube assembly 26. When the poppet valve 28 is open, oil is permitted to flow from the passage 30 to the passage 32, and when the poppet valve 28 is closed, the passages 30 and 32 are fluidly isolated, i.e., their fluid connection is severed. The oil passage 30 may generally extend axially and the oil passage 32 may generally extend radially or obliquely.

Figure 2:
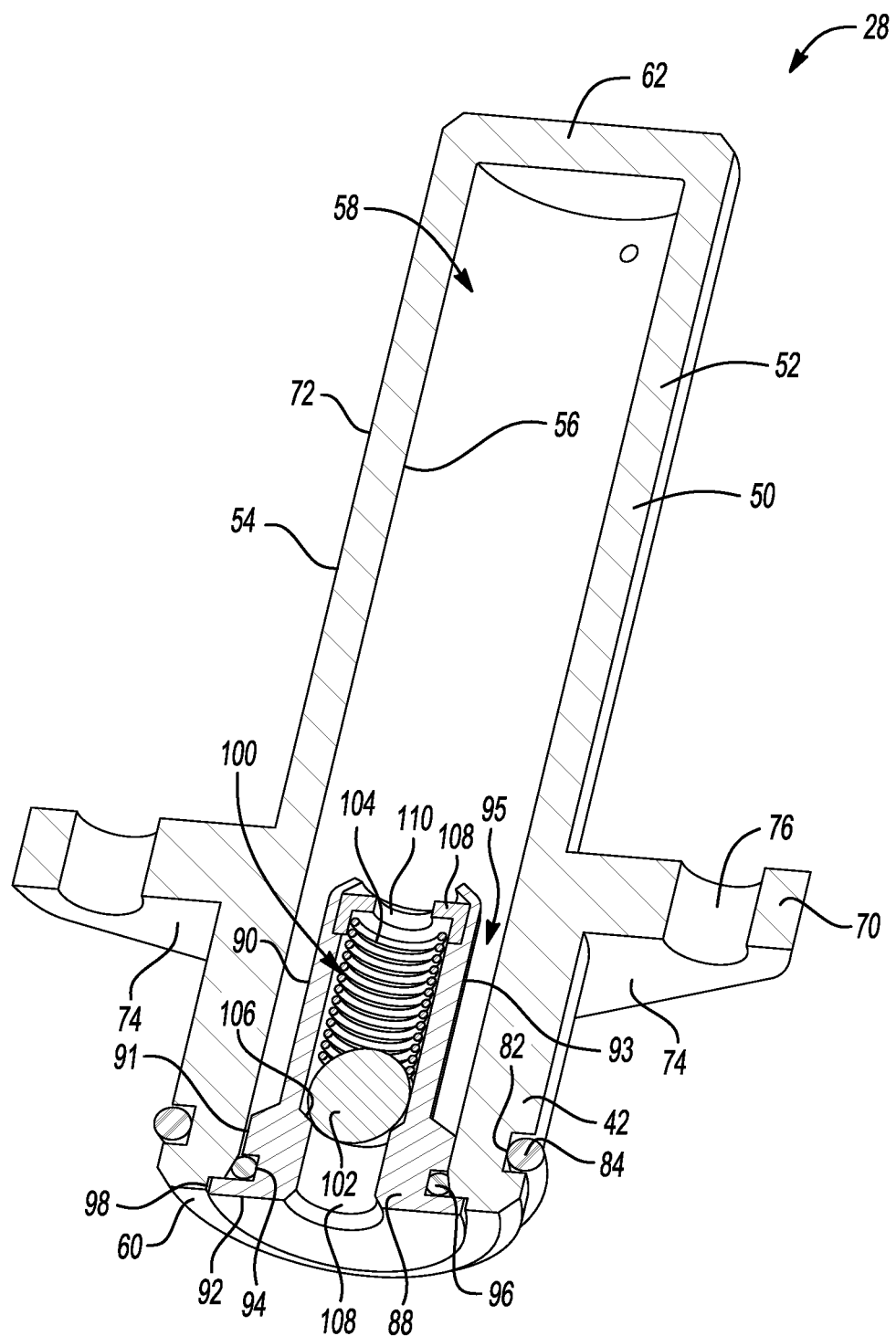
FIG. 2 is a cross-sectional perspective view of an oil-spray tube assembly of the electric machine assembly.

Referring to FIGS. 1 and 2, the tube assembly 26 includes a tube 50 having a sidewall 52 that defines an outer circumferential surface 54 (outer diameter) and an inner circumferential surface 56 (inner diameter) that defines a hollow center 58. The tube 50 may generally extend axially in parallel with the centerline 27 and may be located radially outboard of the electric machine 22. This orientation is not required and may vary in other embodiments. The tube 50 may be placed above the electric machine 22 so that oil may spray from the tube 50 on to the electric machine 22 (as will described in more detail below). The tube 50 may include an open proximal end 60 and a closed distal end 62 that has an end face 64. One or more orifices 66, 68 are defined in the tube 50 and extend from the outer circumferential surface 54 to the inner circumferential surface 56. The orifices 66, 68 allow oil disposed within the hollow center 58 to exit the tube 50. The tube 50 includes a collar 70 and a projection portion 72 that extends out of the housing 24. The collar 70 may be in the form of two ears 74. The ears 74 may extend from opposing sides of the tube 50. Each of the ears 74 may define a through hole 76 configured to receive a fastener 78. The fastener 78 may threaded into a tapped hole 80 of the housing 24. The tube 50 defines a circular groove 82 on the insertion portion 42. A seal 84, such as an O-ring or the like, is received in the groove 82. The seal 84 is configured to engage with the sidewall 38 of the bore to create an oil-tight interface.

The poppet valve 28 is secured to the housing by the tube 50 rather than having the poppet valve 28 as a separate assembly attached to the housing 24. This arrangement produces a smaller package and may be used in hybrid and electric machine modules with limited axially spacing. In the illustrated embodiment, the housing 24 has limited axial spacing between the passage 30 and the electric-machine cavity 35. The poppet valve 28 and the tube 50 fit within this limited axial spacing by placing poppet valve 28 within the tube 50 and securing the poppet valve 28 against the housing 24 with the tube 50.

The poppet valve 28 includes a cylindrical body 86 having a base 88, a barrel 90, and a flange 92 extending radially outward from the base 88. The base 88 has an outer diameter 91 that substantially matches (albeit slightly smaller for clearance) the inner diameter 56 of the tube 50. The barrel 90 extends axially from the base 88 and has a smaller outer diameter 93 than the inner diameter 56 of the tube 50 so that an annular gap 95 is formed between the barrel 90 and the inner diameter 56. The base 88 defines a circular groove 94 configured to receive a seal 96, such as an O-ring or the like. The seal 96 is configured to engage with the inner circumferential surface 56 when the valve 28 is installed into the tube 50. The groove 94 may be adjacent to the flange 92 so that the seal 96 engages with the flange 92. The proximal end 60 of the tube 50 defines an annular seat 98 that is axially recessed and configured to receive the flange 92.

The poppet valve 28 may be a passive device that is biased closed and opens in response to oil pressure exceeding a threshold. The valve 28 may include a valve chamber 100 containing a ball 102 and a spring 104. The base 88 defines an inlet 108 and a valve seat 106 around the inlet 108. The valve seat 106 is sized and shaped to receive the ball 102 and create an oil-tight seal that prevents oil from flowing from the inlet 108 into the valve chamber 100. The spring 104 is disposed between the ball 102 and a spring retainer 108 located at a distal end of the barrel 90. The spring 104 biases the ball 102 against the valve seat 106, which may be referred to as the closed position. When the oil pressure acting on the ball 102 exceeds the strength of the spring 104, the spring 104 compresses allowing the ball 102 to axially move along the barrel 90 to one or more open positions. The spring 104 is tunable to adjust the pop-off pressure of the valve 28. The barrel 90 defines one or more orifices 110 (outlets) that allow oil to flow out of the valve 28 when the ball 102 is in the one or more open positions. The oil exits the orifices 110 and pools within the tube 50. The oil then exits the tube via the orifices 66, 68 to contact the electric machine 22 and remove heat. The oil exiting the orifice 66 flows into passage 32, which may connect to an internal circuit within the electric machine 22, and the oil exiting orifice 68 may drip or spray onto the case 23 of the electric machine 22. A spray nozzle may be attached to the orifice 68 in some embodiments. The oil eventually drains to a sump and is recirculated through the system. In some embodiments, a heat exchanger (not shown) may cool the oil prior to recirculation to the electric machine 22.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST electric-machine assembly 20
electric machine 22
case 23
housing 24
stator 25
oil-spray tube assembly 26
centerline 27
poppet valve 28
passage 30
passage 32
bore 34
cavity 35
bottom wall 36
sidewall 38
face 40
insertion portion 42
tube 50
sidewall 52
outer circumferential surface 54
inner circumferential surface 56
hollow center 58
proximal end 60
distal end 62
end face 64
orifice 66
orifice 68
collar 70
projection portion 72
ears 74
hole 76
fastener 78
hole 80
groove 82
seal 84
cylindrical body 86
base 88
barrel 90
outer diameter 91
flange 92
outer diameter 93
groove 94
annular gap 95
seal 96
annular seat 98
valve chamber 100
ball 102
spring 104
valve seat 106
inlet 108
spring retainer 108
orifices 110

What is claimed is:

1. An oil cooling system comprising:
an oil-spray tube including a sidewall having an outer circumferential surface and an inner circumferential surface that defines a hollow center, the tube further including a proximal end defining an axially recessed annular seat and an orifice extending between the inner and outer surfaces;
a poppet valve disposed in the hollow center, the poppet valve including:
a cylindrical body seated on the inner surface and having a radially extending flange disposed on the annular seat, the body defining an inlet, a cylindrical valve chamber in fluid communication with the inlet and having a valve seat, and an outlet passage, and
a valve having a ball disposed within the valve chamber and axially movable between a closed position in which the ball is seated on the valve seat to sever fluid communication between the inlet and the valve chamber and an open position in which the ball is spaced from the valve seat to place the inlet and the valve chamber in fluid communication; and
a housing defining a bore, a first oil passage extending into the bore, and a second oil passage extending from a sidewall of the bore, wherein the oil-spray tube is received in the bore with the inlet opposite the first oil passage and the orifice aligned with the second oil passage.

2. The oil cooling system of claim 1, wherein the valve further has a spring biasing the ball to the closed position.

3. The oil cooling system of claim 1, wherein the poppet valve further includes a seal disposed against the flange and the inner circumferential surface to form an oil-tight seal between the hollow center and the poppet valve.

4. The oil cooling system of claim 3, wherein the seal is an O-ring.

5. The oil cooling system of claim 3, wherein the sidewall defines a circular groove recessed into the outer circumferential surface, and further comprising a second seal disposed in the groove.

6. The oil cooling system of claim 1, wherein the oil-spray tube further includes a collar extending radially outward from the sidewall.

7. The oil cooling system of claim 1, wherein the cylindrical body further has a base portion having an outer diameter that substantially matches an inner diameter of the inner circumferential surface and a barrel portion having an outer diameter that is smaller than the inner diameter to form an annular gap therebetween.

8. The oil cooling system of claim 1, wherein the oil-spray tube has an end face at a distal end of the tube to close off the hollow center.

9. The oil cooling system of claim 1, wherein the sidewall defines a circular groove recessed into the outer circumferential surface, and further comprising a seal disposed in the groove.

10. An oil-spray tube assembly comprising:
   a tube including an outer circumferential surface, an inner circumferential surface defining a hollow center, a closed distal end, an open proximal end defining an axially recessed annular seat, a first orifice disposed at the distal end, and a second orifice disposed at the proximal end, the orifices extending between the inner and outer surfaces; and
   a poppet valve including a radially extending flange and received in the hollow center with the flange disposed on the annular seat, the valve defining an inlet, a cylindrical valve chamber in fluid communication with the inlet, an outlet exiting the valve chamber, and a valve seat between the inlet and the outlet, wherein a ball is disposed within the valve chamber and is movable between a closed position in which the ball is seated on the valve seat to sever fluid communication between the inlet and the outlet and an open position in which the ball is spaced from the valve seat to place the inlet and outlet in fluid communication.

11. The oil-spray tube assembly of claim 10, wherein the valve further has a spring biasing the ball to the closed position.

12. The oil-spray tube assembly of claim 10, wherein the tube has a circular groove recessed into the outer circumferential surface, and further comprising a seal disposed in the groove.

13. The oil-spray tube assembly of claim 12, wherein the tube defines a collar extending radially outward from the outer circumferential surface, wherein the collar defines an axially extending hole.

14. The oil-spray tube assembly of claim 10, wherein the poppet valve further includes a seal disposed against the flange and the inner circumferential surface to form an oil-tight seal between the hollow center and the poppet valve.

15. The oil-spray tube assembly of claim 14, wherein the seal is disposed in a groove defined in the poppet valve.

16. An electric machine assembly comprising:
   a housing defining first and second oil passages and a bore having a bottom and a sidewall extending from the bottom and defining a perimeter of the bore, wherein the first passage opens into the bottom and the second passage opens into the sidewall;
   an oil-spray tube defining a hollow center and an orifice in fluid communication with the hollow center and extending completely through a sidewall of the tube, the tube including an insertion portion, a protruding portion, and a collar therebetween;
   a poppet valve disposed in the hollow center, the poppet valve defining an inlet, a valve chamber, an outlet, and a movable ball configured to open and close the chamber, wherein the insertion portion is received in the bore with the collar disposed against the housing, the first passage is in fluid communication with the inlet, and the second passage is in fluid communication with the outlet; and
   an electric machine positioned to receive oil from the second passage.

17. The electric machine assembly of claim 16, wherein the valve chamber includes a valve seat, and the poppet valve is closed when the ball is seated on the valve seat and is open when the ball is spaced from the valve seat.

18. The electric machine assembly of claim 16, wherein the insertion portion of the tube defines a circular groove, and further comprising a seal disposed in the groove and seated against the sidewall of the bore.

19. The electric machine assembly of claim 16, wherein the poppet valve further includes a seal disposed against the hollow center to form an oil-tight seal between the hollow center and the poppet valve.

\* \* \* \* \*